US 8,414,233 B2

(12) United States Patent  
Matsui (10) Patent No.: US 8,414,233 B2  
(45) Date of Patent: Apr. 9, 2013

(54) MACHINE TOOL WITH TURNABLE MOVING SECTION

(75) Inventor: Takashi Matsui, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 12/300,521

(22) PCT Filed: Jun. 15, 2007

(86) PCT No.: PCT/JP2007/062087  
§ 371 (c)(1),  
(2), (4) Date: Nov. 12, 2008

(87) PCT Pub. No.: WO2007/148620  
PCT Pub. Date: Dec. 27, 2007

(65) Prior Publication Data  
US 2009/0123246 A1    May 14, 2009

(30) Foreign Application Priority Data  
Jun. 19, 2006   (JP) ................................. 2006-168695

(51) Int. Cl.  
B23C 1/12    (2006.01)

(52) U.S. Cl. ......... 409/201; 409/211; 409/216; 409/230

(58) Field of Classification Search ................. 409/201, 409/211, 216, 230; 408/236; B23C 1/12  
See application file for complete search history.

(56) References Cited

U.S. PATENT DOCUMENTS

| 5,839,862 | A | 11/1998 | Hayashi et al. | |
|---|---|---|---|---|
| 6,045,307 | A * | 4/2000 | Ikoma et al. | 409/199 |
| 6,357,094 | B1 * | 3/2002 | Sugimoto | 29/27 C |
| 6,431,802 | B1 | 8/2002 | Wahl | |
| 6,682,278 | B2 | 1/2004 | Gronbach et al. | |
| 6,836,941 | B2 * | 1/2005 | Prust et al. | 29/27 C |
| 6,874,213 | B2 * | 4/2005 | Prust et al. | 29/27 C |
| 2003/0077139 | A1 * | 4/2003 | Chang et al. | 409/201 |
| 2007/0248428 | A1 * | 10/2007 | Ota | 409/201 |

FOREIGN PATENT DOCUMENTS

| DE | 3732773 A1 * | 4/1989 |
|---|---|---|
| DE | 19952530 A1 * | 5/2001 |
| DE | 19955520 A1 * | 5/2001 |
| DE | 19948335 C1 * | 7/2001 |

(Continued)

OTHER PUBLICATIONS

Office Action issued Apr. 24, 2012 in Japanese Application No. 2008-522423 (With English Translation).

*Primary Examiner* — Eric A Gates (74) *Attorney, Agent, or Firm* — Oblon, Spivak, McClelland, Maier & Neustadt, L.L.P.

(57) ABSTRACT

A moving section of a parallel mechanism is fed having two freedoms. A first moving section base is screw-engaged with a first feed screw shaft, and a second moving section base is screw-engaged with a second feed screw shaft. A spindle head is pivotably connected by a support shaft to the first moving section base. A coupling shaft at an extreme end of an extension lever extending downward from the spindle head is rotatably coupled to a guided piece on a slant linear guide provided on the second moving section base and is coupled to the second moving section base. Thereby, a tilt function maintaining advantages of a tandem drive and being high in rigidity is realized without increasing control axes beyond the number of axes corresponding to tandem axes.

8 Claims, 9 Drawing Sheets

FOREIGN PATENT DOCUMENTS

| | | | |
|---|---|---|---|
| EP | 1188511 A2 | * | 3/2002 |
| JP | 2000042854 A | * | 2/2000 |
| JP | 2003 336713 | | 11/2003 |
| JP | 2003336713 A | * | 11/2003 |
| JP | 2004 529000 | | 9/2004 |
| JP | 2007268682 A | * | 10/2007 |
| WO | WO 9932256 A1 | * | 7/1999 |
| WO | WO 00/51779 | | 9/2000 |
| WO | WO 02102543 | * | 12/2002 |
| WO | WO 2005/037477 A1 | | 4/2005 |
| WO | WO 2005037477 A1 | * | 4/2005 |
| WO | WO 2010006466 A1 | * | 1/2010 |

* cited by examiner

MACHINE TOOL WITH TURNABLE MOVING SECTION

TECHNOLOGICAL FIELD

The present invention relates to a moving section turnable machine tool wherein a spindle head or a table of the machine tool can be linearly moved as it is turned.

BACKGROUND ART

There has been known a machine tool wherein high rigidity and high follow capability are sought by using two synchronized axis feeds, that is, tandem drive for a spindle head (Y-axis) or a table (Z-axis) on which a heavy load is imposed.

Further, as a five-axis machining center with a tool spindle tilt mechanism, there has been known one wherein a turn control axis is added in a tilt mechanical unit and wherein a tool spindle is turned by a built-in direct-drive motor.

Additionally, as one capable of not only moving a spindle head up and down but also turning the same, that using a link mechanism is disclosed in Patent document 1. This, as shown in FIGS. 2 and 3 thereof, is of the construction that two moving bodies 4, 5 driven up and down by servomotors 11, 11 are provided on a single fixed ball screw 9 to be spaced vertically, that a spindle head 2 is attached to one of the moving bodies 5 to be turnable by a rotary body 3, and that one end of the rotary body 3 to which the spindle head 2 is fixed is jointed to the other moving body 4 through a link 7.
Patent Document 1: Japanese unexamined, published patent

DISCLOSURE OF THE INVENTION

Problem to be Solved by the Invention

However, in the prior art wherein the tilt mechanical unit is additionally provided with the turn control axis and has the direct drive motor built therein, it is impossible to make the tool spindle so large in dimension because the tool spindle is tilted by the built-in direct drive motor. For this reason, a problem arises in that the machining capability is low in contrast to the dimension of the machine. Further, other problems arise in that the addition of the motor, an encoder and the like for the turn control axis becomes necessary and causes the cost to increase and that an increase in dimension becomes indispensable for higher rigidity because the rigidity exactly depends on a servo-hold capability of the built-in motor for the turn control axis.

The machine tool in Patent Document 1 is accompanied by a problem that it is inferior in rigidity and follow capability to the tandem drive type because it only has the single ball screw 9.

The present invention has been made to solve the foregoing problems, and the object is to provide a moving section turnable machine tool wherein a high-rigidity tilt function is provided with advantages of a tandem drive retained.

Measures for Solving the Problem

In order to attain the aforementioned object, in the present invention, for tilt, there is not used a turn mechanism, but there is employed a parallel mechanism having two freedoms (a linear axis and a turn axis), so that a machine tool is configured to be of a parallel mechanism which utilizes two tandem driven axes.

That is, according to a first form of the present invention, there is provided a moving section turnable machine tool which is a machine tool having a moving section which is fed by two synchronized axes along an arbitrary one axis of X, Y and Z-axes being three orthogonal axes and which comprises a pair of drive axes for feeding the moving section, the drive axes being shifted in the relative position along any one of two other axes than the arbitrary one axis; a first moving section base linearly movably guided on a first linear guide and driven by one drive axis of the pair of drive axes in synchronously feeding the moving section; a second moving section base linearly movably guided on a second linear guide and driven by the other drive axis of the pair of drive axes in synchronously feeding the moving section; a configuration pivotably attaching the moving section to the first moving section base; and a link mechanism connecting the moving section with the second moving section base so that the relative motion of the second moving section base to the first moving section base causes the moving section to be pivoted about the other axis of the two other axes than the arbitrary one axis.

With the construction taken as described above, when the pair of drive axes are moved to be synchronized exactly, the first moving section base and the second moving section base are linearly moved on the linear guides in exact synchronism. Thus, the first moving section base and the second moving section base can be regarded as one body, and the moving section is fed by the two synchronized axes, that is, is given a tandem drive with its posture unchanged. Thus, there can be achieved high rigidity and high follow capability which are the characteristics of the tandem drive. Then, when the other drive axis is moved relative to one axis (which may be stationary or may be moving), the second moving section base is moved relative to the first moving section base. Thus, the moving section jointed by the link mechanism is pivoted (turned). Because of turning by the link mechanism, there can be realized high rigidity and high positioning speed. Since a parallel mechanism of two freedoms is realized in this way, an effect can be achieved in that a tilt function is realized without increasing control axes beyond the number of axes corresponding to the tandem axes, resulting in cost reduction. Further, since no control axis for turn is provided, remarkable effects can be achieved in that space-saving is realized and that high rigidity is given by the use of the parallel mechanism. Accordingly, it is possible to incorporate a large tool spindle of a high capability.

Herein, the invention in a second form is characterized in that the link mechanism comprises an engaging piece extending from the moving section as one body; and a third guide provided on the second moving section base and having a stroke which is able to absorb a component normal to the axial direction of the other drive axis of a circular arc motion which is given to the engaging piece with the pivot movement of the moving section; and that the engaging piece is guided on the third guide. With the construction taken like this, an effect can be achieved in that the link mechanism is configured to be large in the turn range of the moving section and to be high in rigidity.

Further, the invention in a third form is characterized in that the third guide is a linear guide and is provided obliquely relative to the axial direction of the drive axes. With the construction taken like this, an effect can be achieved in that the link mechanism is further increased in rigidity because of being the linear guide.

The invention in a fourth form is characterized in that the moving section is a spindle head. With the construction taken like this, the machine tool can be configured as one which is capable of turning the spindle head.

The invention in a fifth form is characterized in that the moving section is a table. With the construction taken like this, the machine tool can be configured as one which is capable of turning or tilting the table.

The invention in a sixth form is characterized in that the moving section is a column. With the construction taken like this, the machine tool can be configured as one which is capable of turning or tilting the column.

The invention in a seventh form is characterized in that the third guide is a linear guide which guides the engaging piece to be movable in a direction perpendicular to the axial direction of the drive axes. With the construction taken like this, the direction in which a turn moment acts on the moving section and the moving direction of the engaging piece make a relation that they are almost orthogonal in the whole turn range for the moving section, so that the machine tool can be configured as one which is capable of enhancing the rigidity of the moving section against the machining load without having a singular point.

The invention in an eighth form is characterized in that the spindle head is turnable an angle of 90 degrees between an angle which directs a tool spindle axis horizontally and another angle which directs the tool spindle axis vertically, and that the engaging piece is guided on the third guide to be movable in a horizontal direction. With the construction taken like this, the direction in which a turn moment acts on the spindle head and the moving direction of the engaging piece make a relation that they are almost orthogonal in the whole turn range for the spindle head, so that the machine tool can be configured as one which is capable of enhancing the rigidity of the spindle head against the machining load without having a singular point.

The invention in a ninth form is characterized in that the configuration comprises a support shaft pivotably attaching the moving section to the first moving section base; that the link mechanism includes a coupling shaft coupling the second moving section base and the moving section; and that a line connecting the support shaft with the coupling shaft is inclined an angle of 45 degrees relative to the tool spindle axis. With the construction taken like this, the moving amount which the second moving section base should move relative to the first moving section base in turning the spindle head an angle of 45 degrees from the horizontal position can be made to be equal to the moving amount which the second moving section base should move relative to the first moving section base in further turning the spindle head an angle of 45 degrees to the vertical position. Thus, the machine tool can be configured as one which is capable of turning the spindle head at almost the same turn speed over the whole turn range and which is also capable of minimizing the moving amount for the engaging piece to move back and force in turning the spindle head the angle of 90 degrees.

The invention in a tenth form is characterized in that the configuration comprises a support shaft pivotably attaching the moving section to the first moving section base; that the link mechanism includes a coupling shaft coupling the second moving section base and the moving section; and that the gravity center position of the spindle head is set at a ½ position of the distance between the support shaft and the coupling shaft. With the construction taken like this, the machine tool can be configured as one which is capable of equally bearing the self-weight of the spindle head by the support shaft and the coupling shaft and which is thus capable of improving the load characteristic against a machining reaction, so that the machine tool can be configured as one which is capable of realizing high speed and high acceleration/deceleration and which is capable of shortening the cycle time.

The invention in an eleventh form is characterized in that the gravity center position of the spindle head is set at a ½ position of the distance between the support shaft and the coupling shaft. With the construction taken like this, the machine tool can be configured as one which is capable of not only equally bearing the self-weight of the spindle head by the support shaft and the coupling shaft but also turning the spindle head at almost the same turn speed over the whole turn range and which is also capable of minimizing the back-and-forth moving amount for the engaging piece in turning the spindle head an angle of 90 degrees.

EFFECTS OF THE INVENTION

As described above, in the machine tool according to the prevent invention, since the feed for the moving section is realized by a parallel mechanism having two degrees of freedom, outstanding advantages can be achieved in that a high-rigidity tilt function can be realized with advantages of the tandem drive retained and without increasing the number of control axes beyond the number of axes corresponding to the tandem axes.

DESCRIPTION OF REFERENCE SYMBOLS 11 first linear guide
12 first moving section base
13 guide
14 first feed screw shaft
15 first servomotor
18 support shaft
21 second linear guide 22 second moving section base
23 guide
24 second feed screw shaft
25 second servomotor
28, 63 linear guides
31 spindle head (moving body)
32 extension lever
33 coupling shaft (engaging piece)

PREFERRED EMBODIMENTS FOR PRACTICING THE INVENTION

Figure 1:
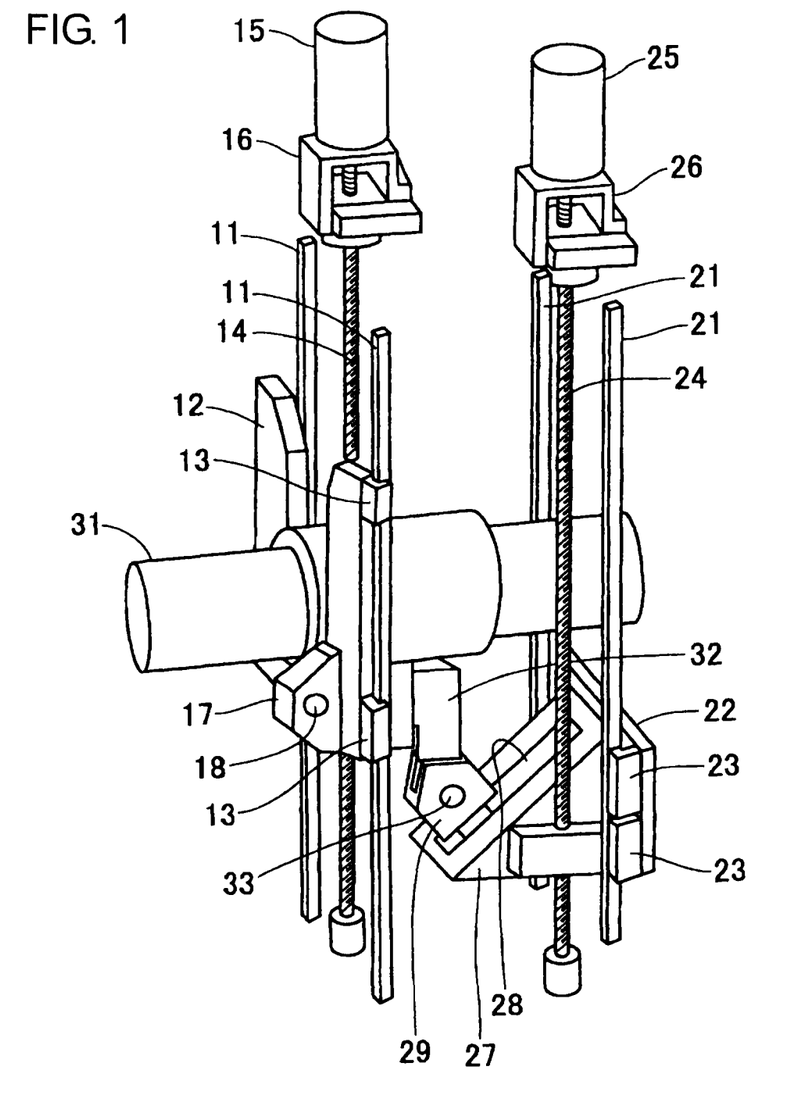
[FIG. 1] is a perspective view showing the basic construction of a machine tool in a first embodiment according to the present invention, with a spindle head held horizontally.

Hereafter, a first embodiment of the present invention will be described with reference to the drawings. FIG. 1 is a perspective view showing the basic construction of a machine tool according to the present invention. A column is omitted from illustration. At a front part (the left part shown in the figure), a pair of first linear guides 11, 11 are fixed on the column not shown to extend vertically. A first moving section base 12 is guided on the first linear guides 11, 11 through four guides 13 (two of which are shown) and is supported to be movable vertically. At a position adjacent to the first linear guide 11, a first feed screw shaft 14 (corresponding to a drive shaft in the present invention) comprising a ball screw is rotatably supported by the column not shown. The first feed screw shaft 14 vertically extends in parallel to the first linear guides 11, 11. The first feed screw shaft 14 is jointed at its upper end with an output shaft of a first servomotor 15 to be drivingly rotated. The first servomotor 15 is fixed on the top of the column through a bracket 16. The first feed screw shaft 14 is screw-engaged with a feed nut (not shown) secured to the first moving section base 12 and moves the first moving section base 12 vertically in dependence on the rotational position of the first servomotor 15. The first moving section base 12 is provided with a projection portion 17 protruding forward, and a support shaft 18 is horizontally supported by the projection portion 17.

Similarly, another pair of second linear guides 21, 21 are fixed on a column not shown on a rear side (the right side in the figure) of the machine tool and vertically extend in parallel with the first linear guides 11, 11. On the second linear guides 21, 21, a second moving section base 22 is guided through four guides 23 (two of which are shown) and is supported to be movable vertically. At a position adjacent to the second linear guide 21, a second feed screw shaft 24 (corresponding to a drive axis in the present invention) comprising a ball screw is supported on the column not shown to be rotatable. The second feed screw shaft 24 vertically extends in parallel to the first and second linear guides 11, 11, 21, 21. The second feed screw shaft 24 is coupled at its upper end to an output shaft of a second servomotor 25 and is drivingly rotatable. The second servomotor 25 is fixed on the top of the column through a bracket 26. The second feed screw shaft 24 is screw-engaged with a feed nut (not shown) secured to the second moving section base 22 and vertically moves the second moving section base 22 in dependence on the rotational position of the second servomotor 25. A triangle section 27 protruding forward is bodily provided on the second moving section base 22, and a linear guide 28 is provided at a ridgeline section of the triangle section 27 which makes an angle of 45 degrees with the horizon. A guided piece 29 is guided along the linear guide 28 to be linearly movable in an oblique direction.

A spindle head 31 is supported to be pivotable about the support shaft 18 provided in the protruding portion 17 of the first moving section base 12. The spindle head 31 carries a tool spindle motor and performs machining operations on a workpiece with a tool held in a tool spindle. The spindle head 31 constitutes a moving section in the present invention. An extension lever 32 is secured to around the center part of the spindle head 31 and extends downward. An extreme end of the extension lever 32 is rotatably coupled to a guided piece 29, which runs on the slant linear guide 28 of the second moving section base 22, through a coupling shaft 33. The linear guide 28, the guided piece 29, the extension lever 32 and the coupling shaft 33 constitute a link mechanism for providing pivot motion to the spindle head 31. The coupling shaft 33 at the extreme end of the extension lever 32 constitutes an engaging piece. Here, considering a square made by the first and second linear guides 11, 11, 21, 21, the two feed screw shafts 14, 24 are arranged at diagonal positions. This means that the two feed screw shafts 14, 24 are arranged at positions that mutually differ in the distance from a plane (the plane including the first linear guides 11, 11) on which the spindle head 31 is linearly guided when fed synchronously. Further, the linear guide 28 has a stroke which can absorb a component normal to the second feed screw shaft 24 of a circular arc motion that the coupling shaft 33 at the extreme end of the extension lever 32 draws with the turn of the spindle head 31.

The operation based on the aforementioned construction will be described. When the two servomotors 15, 25 are synchronously rotated to make the first feed screw shaft 14 and the second feed screw shaft 24 rotate in exact synchronism, the first moving section base 12 and the second moving section base 22 are linearly moved on the respective linear guides 11, 11, 21, 21 as they are synchronized exactly. Thus, the first moving section base 12 and the second moving section base 22 can be regarded as one which is made bodily, and the spindle head 31 is fed by the synchronizing two axes, that is, is given tandem drive with the posture fixed. Therefore, there can be exerted high rigidity peculiar to the tandem drive and high follow capability.

Figure 2:
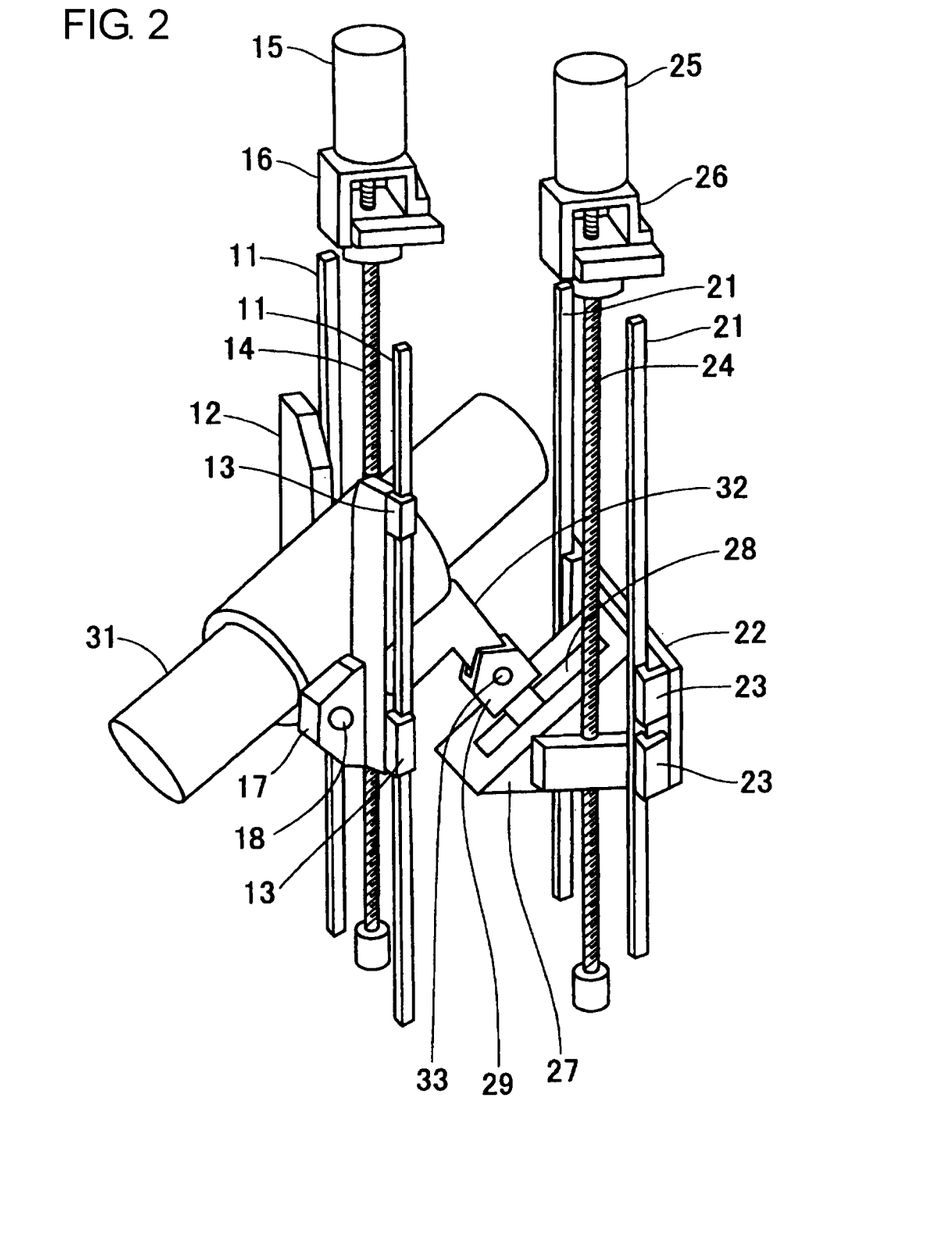
[FIG. 2] is a perspective view showing the basic construction of the machine tool in the first embodiment according to the present invention, with the spindle head held at an angle of 45 degrees.
Figure 3:
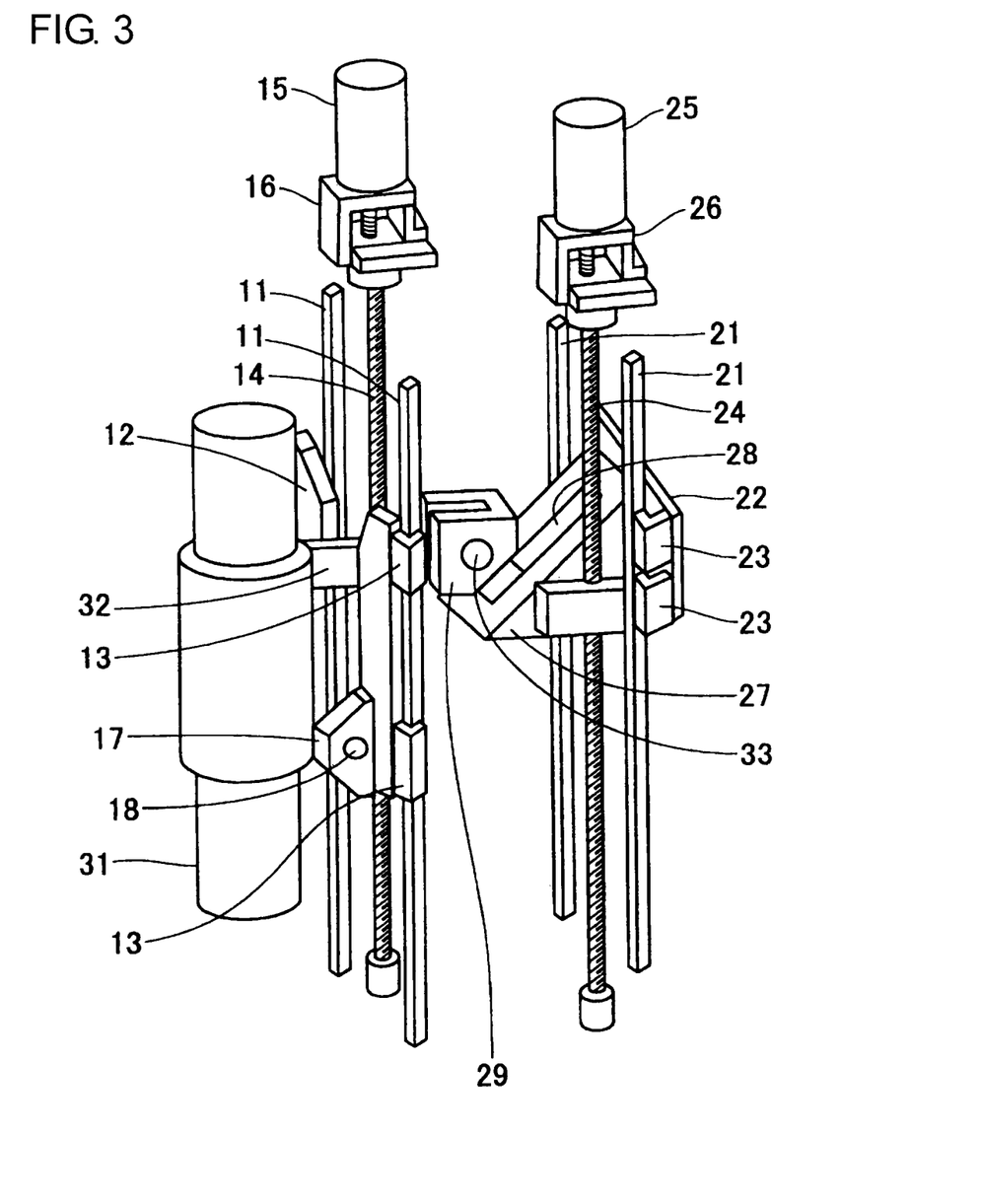
[FIG. 3] is a perspective view showing the basic construction of the machine tool in the first embodiment according to the present invention, with the spindle head oriented downward.

Let it be assumed that the second moving section base 22 is moved upward by drivingly rotating the second feed screw shaft 24 with the first feed screw shaft 14 remaining stopped. Then, with the upward movement of the second moving section base 22, the spindle head 31 is tilted to cause the guided piece 29 to gradually move up on the slant linear guide 28. At the same time, the spindle head 31 is turned about the support shaft 18 to bow its upper portion gradually. FIG. 2 is a perspective view illustrative of the state that the spindle head 31 has been inclined by the angle of 45 degrees. In this state, the guided piece 29 has been moved to the uppermost position on the linear guide 28. When the second moving section base 22 is further moved upward, the guided piece 29 begins to go down along the linear guide 28, whereby the spindle head 31 is further inclined beyond the 45-degree position. FIG. 3 is a perspective view illustrative of the spindle head which has been inclined by the angle of 90 degrees. In this state, the guided piece 29 has returned to the lowermost position on the linear guide 28.

As described above, by moving the second moving section base 22 upward relative to the first moving section base 12, the spindle head 31 can be turned from the horizontal position to the state where it is inclined by the angle of 90 degrees to be oriented downward. Conversely, by moving the second moving section base 22 downward relative to the first moving section base 12, the spindle head can be returned from the 90-degree inclined state to the horizontal state.

The description has been made with the first feed screw shaft 14 held stopped. However, the point here is the relative positional relation between the first moving section base 12 and the second moving section base 22. Therefore, in the state that the spindle head 31 is being moved upward and downward by drivingly rotating the first and second feed screw shafts 14, 24, the relative positional relation between the first moving section base 12 and the second moving section base 22 can be changed by rotating the second feed screw shaft 24 relative to the first feed screw shaft 14 being rotated, whereby the spindle head 31 can be turned as it is moved upward and downward.

Figure 4:
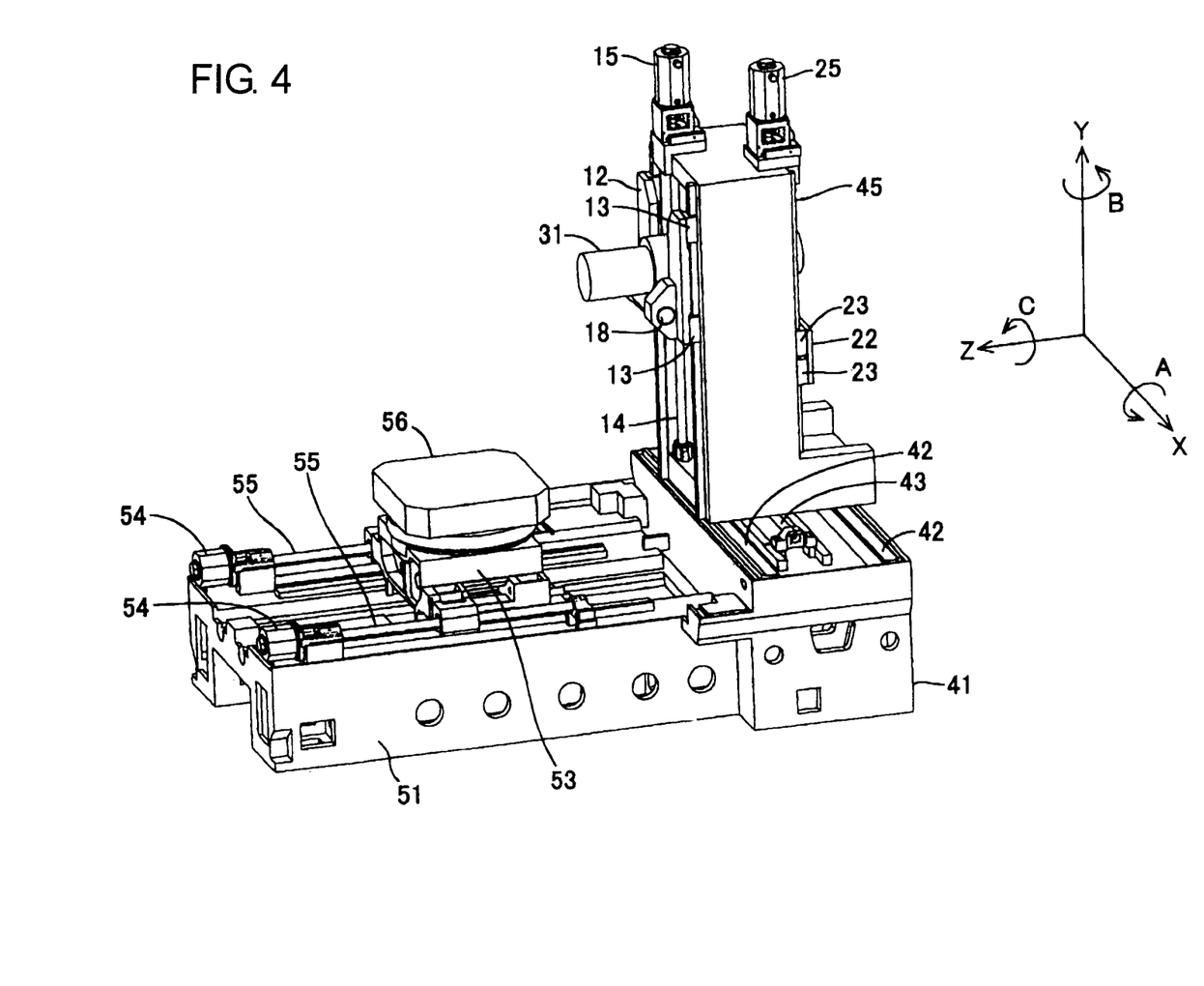
[FIG. 4] is a perspective view showing the machine tool according to the present invention, with the spindle head held horizontally.

FIG. 4 is a perspective view illustrating the machine tool with the aforementioned basic construction applied thereto. A bed 41 is provided thereon with linear guides 42, 42, and a column 45 is provided to be movable left and right (in X-direction) along the linear guides 42, 42. The moving position of the column 45 is controlled by an X-axis servomotor, not shown, through an X-axis feed screw shaft 43. The parallel mechanism having been described with reference to FIGS. 1 to 3 is incorporated in the column 45. On the top of the column 45, the first servomotor 15 and the second servomotor 25 are arranged at diagonal positions. The position of the first moving section base 12 on the front side is controlled by the first servomotor 15, while the position of the second moving section base 22 on the rear side is controlled by the second servomotor 25. The spindle head 31 is carried on the first moving section base 12 to be pivotable about the horizontal support shaft 18. As described earlier, the rear part of the spindle head 31 is coupled to the second moving section base 22 through the link mechanism hidden in the column 45. Hereafter, description regarding the same components is omitted because they are given the same reference numerals. The first and second servomotors 15, 25 have both of the function as Y-axis motor for moving the spindle head 31 vertically and the function as A-axis motor for turning the spindle head 31.

Further, the machine tool is provided with a table given tandem drive. Linear guides are provided on a table bed 51, and a table base 53 is movable along the linear guides in a front-rear (Z-axis) direction. A table 56 for mounting a workpiece thereon is provided on the table base 53. The moving position of the table base 53 are drivingly controlled by two Z-axis feed screw shafts 55, 55 which are driven by two Z-axis servomotors 54, 54 operated synchronously.

Figure 5:
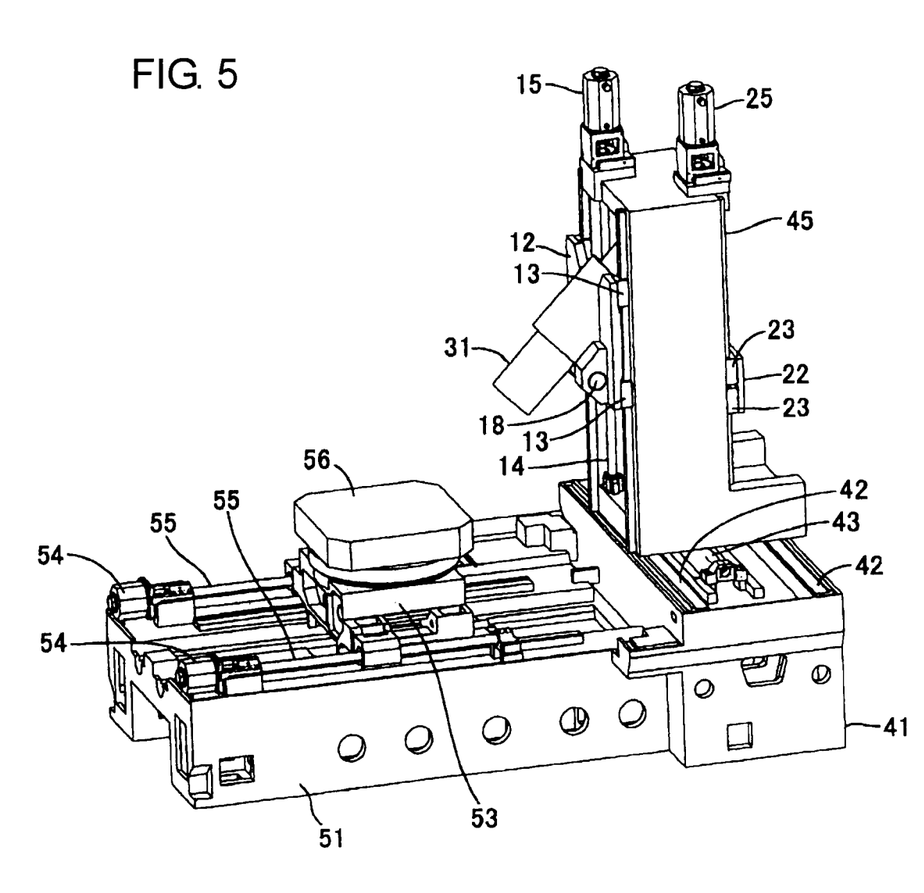
[FIG. 5] is a perspective view showing the machine tool according to the present invention, with the spindle head being at an angle of 45 degrees.
Figure 6:
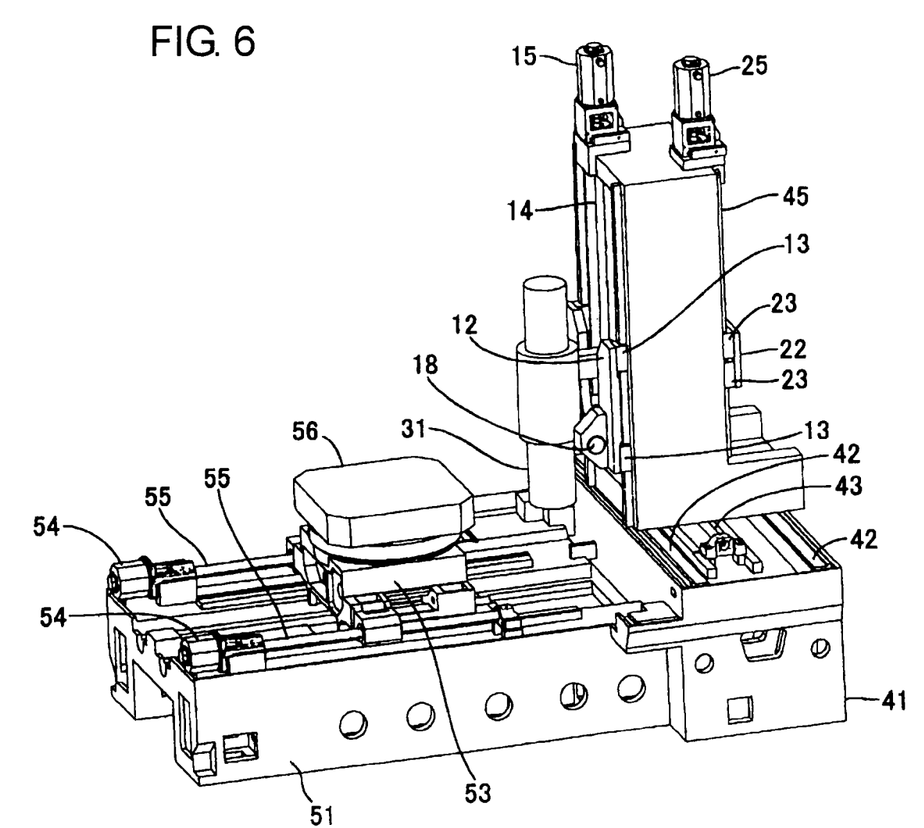
[FIG. 6] is a perspective view showing the machine tool according to the present invention, with the spindle head oriented downward.

FIGS. 5 and 6 are perspective views illustrative of the machine tool with the spindle head 31 having been turned. Here, unlike FIGS. 1 to 3, the turn of the spindle head 31 is carried out by moving the first moving section base 12 downward with the second moving section base 22 fixed. Thus, the turn of the spindle head 31 takes place together with the downward movement of the spindle head 31.

Coordinate axes are indicated in FIG. 4. The axes are three mutually orthogonal axes of X-axis, Y-axis and Z-axis and A-axis, B-axis and C-axis which rotate about their axes parallel to the respective axes. The X-axis is for left-right movement of the column 45, the Y-axis is for vertical movement of the spindle head 31, and the Z-axis is for front-rear movement of the table 56. The A-axis is for turn motion of the spindle head 31. Rotational movements about the B-axis and C-axis are not performed in the foregoing embedment. In the foregoing embodiment, the machine tool is of the configuration having the moving section (spindle head 31) which is fed by two synchronized axes along an arbitrary one axis (Y-axis) of X, Y and Z-axes being three mutually orthogonal axes, wherein two drive axes (feed screw shafts 14, 24) for feeding the moving section (spindle head 31) are shifted in the relative position which is along either one axis (Z-axis) of two other axes (X-axis, Z-axis) than the arbitrary one axis (Y-axis), and wherein the link mechanism is provided for linking the moving section (spindle head 31) to the second moving section base 22 so that the relative movement of the second moving section base 22 to the first moving section base 12 causes the moving section (spindle head 31) to pivotably move about the other axis (X-axis) of the two axes (X-axis, Z-axis) which are other than the arbitrary one axis (Y-axis).

Figure 7:
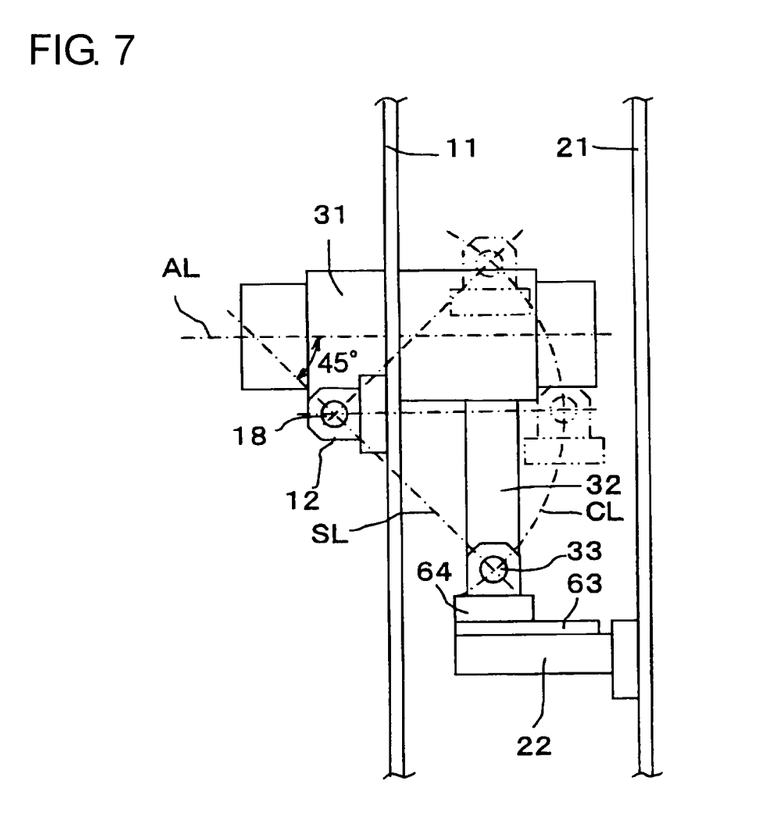
[FIG. 7] is a schematic view showing the basic construction of a machine tool in a second embodiment according to the present invention.
Figure 8:
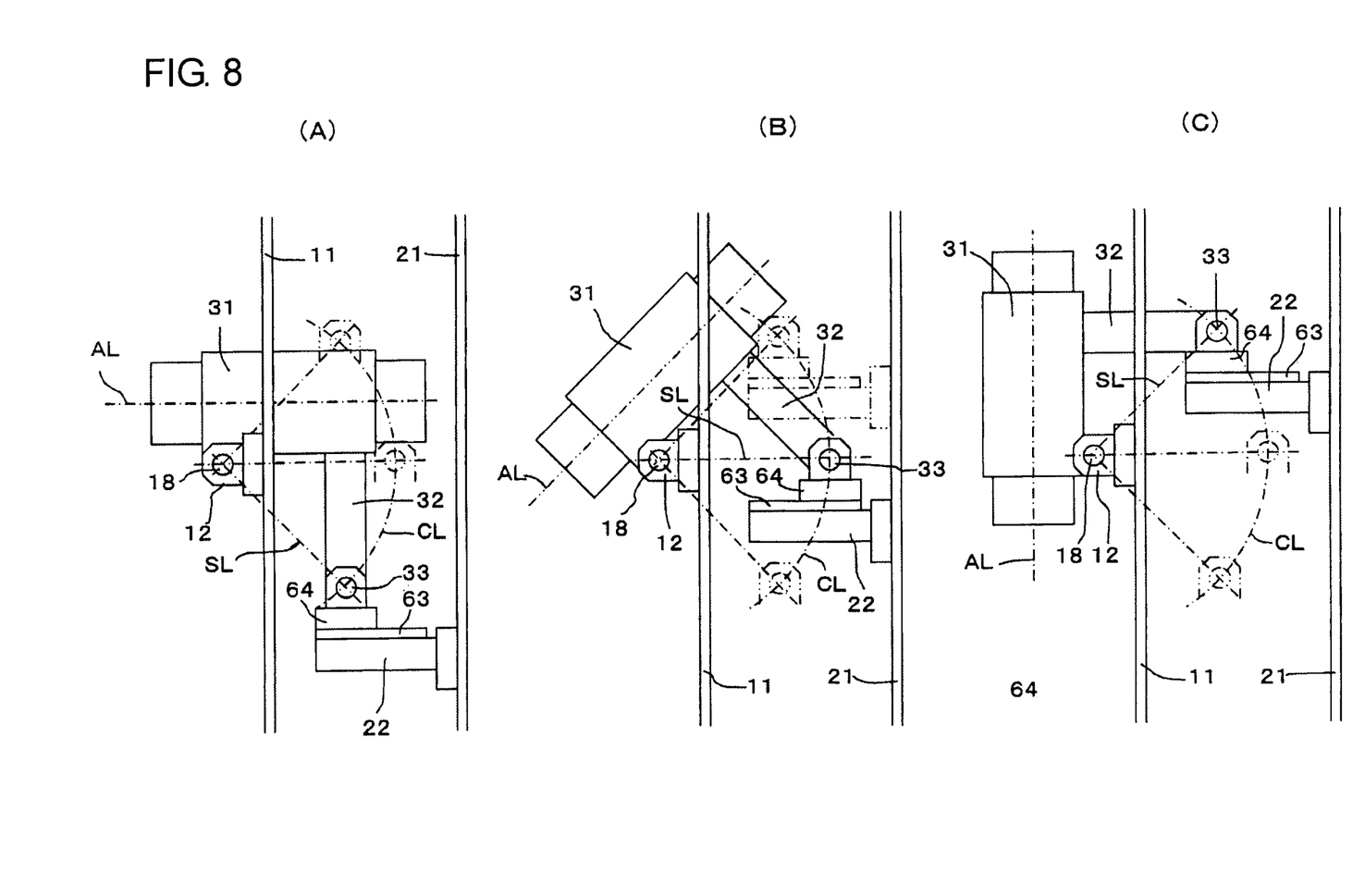
[FIG. 8] is for showing the operational states of the machine tool in the second embodiment according to the present invention, wherein (A) shows the state that a spindle head is held horizontally, (B) shows the state that the spindle head is tilted by an angle of 45 degrees, and (C) shows the state that the spindle head is held vertically.

FIGS. 7 and 8 show a second embodiment according to the present invention. The different point from the first embodiment is that in order to absorb the component normal to the moving direction of the second moving section base 22 (the axial direction of the second feed screw shaft 24) of a circular arc motion which the coupling shaft 33 at the extreme end of the extension lever 32 draws with the turn of the spindle head 31, the linear guide 28 guides the guided piece 29 to be movable in the horizontal direction normal to the moving direction of the second moving section base 22.

Specifically, in the second embodiment, as shown in FIGS. 7 and 8(A), the first and second moving section bases 12, 22 are configured to be moved by the first and second feed screw shafts 14, 24 (refer to FIG. 1) in the vertical direction (Y-axis direction) in parallel relation, in the same manner as mentioned in the first embodiment. The spindle head 31 is carried on the first moving section base 12 to be turnable about the horizontal support shaft 18, and the spindle head 31 is turnable through the angle of 90 degrees from an original position where the axis AL of the tool spindle extends as shown horizontally in FIG. 8(A), to a turned position where the axis AL of the tool spindle extends vertically (downward) as shown in FIG. 8(C). It should be noted that unless described particularly, the direction of the tool spindle axis AL in the following description indicates that in the state that the spindle head 31 has been positioned to the original position.

The spindle head 31 has fixed thereto the extension lever 32 which extends downward in a vertical direction perpendicular to the tool spindle axis AL. In the state that the tool spindle axis AL is oriented vertically (downward) as shown in FIG. 8(C), the extreme end of the extension lever 32 extending horizontally stays at a mid position between the first linear guides 11 and the second linear guides 21. On one hand, the second moving section base 22 is provided thereon with a horizontal linear guide 63 parallel to the Z-axis direction. A guided piece 64 is guided on the linear guide 63 to be linearly movable in a horizontal direction parallel to the Z-axis direction. The extreme end of the aforementioned extension lever 32 is pivotably coupled to the guided piece 64 through the coupling shaft 33 extending in parallel to the support shaft 18. Thus, when the extension lever 32, together with the spindle head 31, is turned about the support shaft 18, the coupling shaft 33 at the extreme end of the extension lever 32 is moved along a circular arc, with which the guided piece 64 is guided along the linear guide 63 and is linearly moved in the horizontal direction parallel to the Z-axis direction.

Further, a straight line SL which connects the support shaft 18 pivotably supporting the spindle head 31 on the second moving section base 22 to the coupling shaft 33 pivotably coupling the extension lever 32 and the guided piece 64 is set to incline an angle of 45 degrees relative to the tool spindle axis AL. Thus, when the spindle head 31 is turned from the original position shown in FIG. 8(A) to an angular position inclined an angle of 45 degrees shown in FIG. 8(B), the straight line SL connecting the aforementioned support shaft 18 and the coupling shaft 33 comes into alignment with a horizontal line. When the spindle head 31 is further turned through an angle of 45 degrees from the position shown in FIG. 8(B) to another position shown in FIG. 8(C) to direct the tool spindle axis AL vertically, the straight line SL connecting the support shaft 18 and the coupling shaft 33 is inclined by the angle of 45 degrees relative to a horizontal line. Then, because the turn of the spindle head 31 causes the coupling shaft 33 to follow the locus of a circular arc CL having the center on the support shaft 18, the guided piece 64 is caused to horizontally move back and forth along the linear guide 63.

As described above, in the second embodiment, the construction is taken to movably guide the guided piece 64 by the linear guide 63 in a horizontal direction normal to the moving direction of the second moving section base 22 and hence, to absorb the component normal to the moving direction of the second moving section base 22 of the circular arc motion which the coupling shaft 33 at the extreme end of the extension lever 32 makes with the turn of the spindle head 31. Thus, over the whole turn range of the spindle head 31, there can be maintained a relation that the direction of turn moment acting on the spindle head 31 becomes almost orthogonal to the moving direction of the guided piece 64, so that the spindle head 31 can be increased in rigidity against a machining load without having any singular point.

Further, in the second embodiment, since the angle of the straight line SL connecting the support shaft 18 and the coupling shaft 33 is set to 45 degrees relative to the tool spindle axis AL, the moving amount which the second moving section base 22 should move relative to the first moving section base 12 in turning the spindle head 31 the angle of 45 degrees from the horizontal position comes to equal to the moving amount which the second moving section base 22 should move relative to the first moving section base 12 in further turning the spindle head 31 the angle of 45 degrees to the vertical position. Thus, it can be realized that the spindle head 31 is turned at almost the same turn speed over the whole turn range thereof through the rotation at a constant speed of the second servomotor 25 (refer to FIG. 1) which moves the second moving section base 22 up and down. In addition, it is possible to minimize the moving amount for the guided piece 64 to move back and force in turning the spindle head 31 an angle of 90 degrees.

Figure 9:
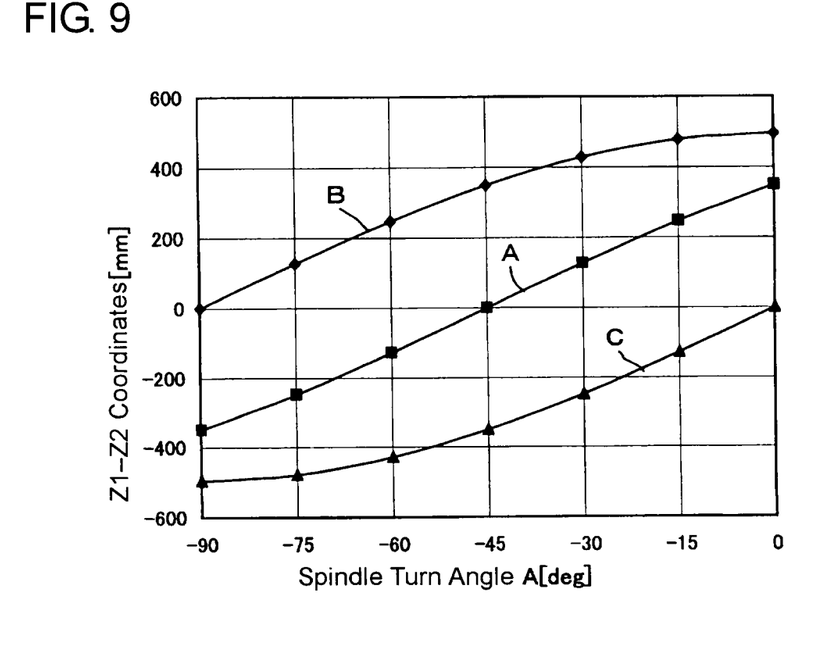
[FIG. 9] is a graph showing the control property of the machine tool in the second embodiment according to the present invention.

FIG. 9 is a control property graph showing the relation of the turn angle of the spindle head 31 to the relative moving amount between the first moving section base 12 and the second moving section base 22 (the coordinate position of the second moving section base 22 on the assumption that the first moving section base 12 is fixed), wherein the angle that the straight line SL connecting the support shaft 18 to the coupling shaft 33 makes with the tool spindle axis AL is taken as parameters. Curve A represents the property that is given in the present embodiment where the straight line SL is set to incline the angle of 45 degrees relative to the tool spindle axis AL, while curves B and C respectively represent the properties that would be given if the straight line SL were set to make the angle of 90 degrees and the angle of 0 degree respectively with the tool spindle axis AL. From the graph, it can be understood that in contrast with the those cases of 90 degrees and 0 degree, the case of 45 degrees in the present embodiment is able to vary at an almost fixed rate the turn angle of the tool spindle head 31 relative to the relative moving amount between the first moving section base 21 and the second moving section base 22.

Figure 10:
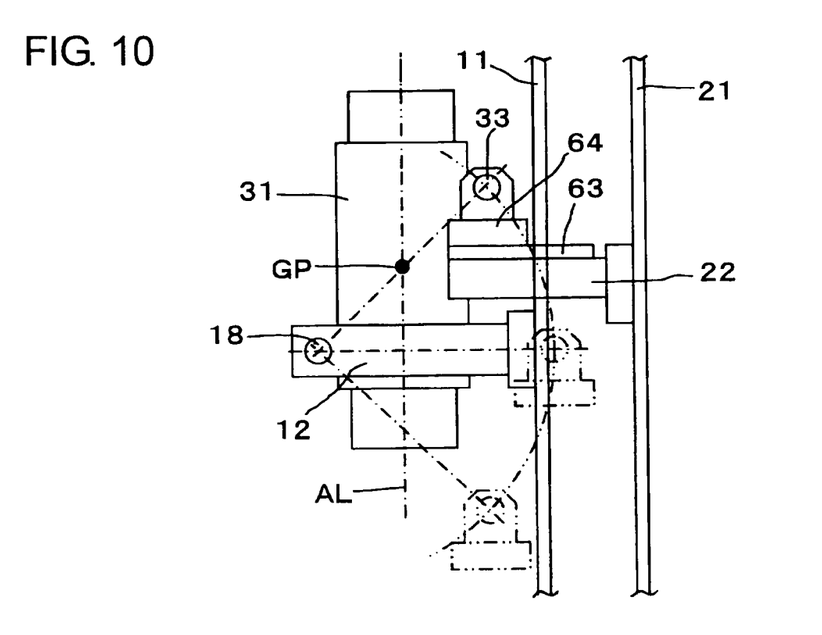
[FIG. 10] is a schematic view showing the basic construction of a machine tool in a third embodiment according to the present invention.

FIG. 10 shows a third embodiment according to the present invention. The different point from the second embodiment is that a configuration is taken to suppress variations of the loads which the self-weight of the spindle head 31 exerts respectively on the first and second moving section bases 12, 22 during the turn of the spindle head 31.

Specifically, in the third embodiment, as shown in FIG. 10, the location of the aforementioned support shaft 18 is arranged on the side opposite to the coupling shaft 33 with the spindle head 31 therebetween, and the gravity center position GP of the spindle head 31 is set to reside at a ½ position of the distance between the support shaft 18 and the coupling shaft 33.

Also in the third embodiment, the linear guide 63 is provided on the second moving section base 22 to extend horizontally, the guided piece 64 is guided along the linear guide 63 to be linearly movable in a horizontal direction parallel to the Z-axis direction, and the spindle head 31 is pivotably coupled to the guided piece 64 through the coupling shaft 33.

As described above, in the third embodiment, by setting the gravity center position GP of the spindle head 31 to reside at the ½ position of the distance between the support shaft 18 and the coupling shaft 33, it becomes possible to make the gravity center position of the spindle head 31 coincide with the ½ position of the distance between the support shaft 18 and the coupling shaft 33 at all times regardless the turn position taken by the spindle head 31, so that the self-weight of the spindle head 31 can be equally borne by the support shaft 18 and the coupling shaft 33. Accordingly, the property of the load against a machining reaction can be improved, so that it becomes possible to realize high speed and high acceleration/deceleration and hence, to make contribution to shortening the cycle time.

Several embodiments for practicing the present invention have been described hereinabove. The present invention is not limited to these embodiments, and various improvements and modifications in design are possible to the extent that does not deviate from the gist of the present invention. For example, although in the foregoing embodiments, description has been made taking an example in which feed screw shafts comprising ball screws are used as drive shafts, linear motors may be suitable to be used in place of feed screw shafts. Further, although description has been made regarding the construction that turns the spindle head about the A-axis, there may be taken a construction that turns the spindle head about the C-axis by changing the link mechanism.

Although description has been made regarding the case that the moving section is the spindle head, the moving section may be any one of the spindle head, the table and the column. Where the moving section is the spindle head, the spindle head is fed by two synchronized axes in the Y-axis direction and is turned about the A-axis or the C-axis. Where the moving section is the table, the same is fed by two synchronized axes in the Z-axis direction and is turned about the B-axis or the A-axis. Where the moving section is the column, the same is fed by two synchronized axes in the X-axis direction and is turned about the B-axis or the C-axis. Where the table should be turned, in the example shown in FIG. 4, the table cannot be turned about any axis except the B-axis even in the addition of a link mechanism. However, by shifting the relative position along the Y-axis between the two Z-axis feed screw shafts 55, the table may be turnable about the A-axis. Where the column should be turned, the same cannot be turned in the example shown in FIG. 4 because the X-axis feed screw shaft 43 is a single shaft. However, where there are used two synchronized axes, it becomes possible to turn the column about the B-axis by changing the relative position along the Z-axis of the X-axis feed screw shafts and to turn the column about the C-axis by changing the relative position along the Y-axis of the X-axis feed screw shafts.

Industrial Applicability:

The machine tool with the turnable moving section is suitable for use in a machine tool wherein a spindle head or a table should be turned as it is linearly moved.

The invention claimed is:

1. A moving section turnable machine tool having a moving section which is fed by two synchronized axes along an arbitrary one axis of X, Y and Z-axes being three orthogonal axes, the machine tool comprising:
- a pair of drive axes for feeding the moving section, the drive axes being shifted in the relative position along any one of two other axes than the arbitrary one axis;
- a first moving section base linearly movably guided on a first linear guide and driven by one drive axis of the pair of drive axes in synchronously moving the moving section;
- a second moving section base linearly movably guided on a second linear guide and driven by the other drive axis of the pair of drive axes in synchronously moving the moving section;
- a configuration including a single axis pivotably attaching the moving section directly to the first moving section base such that the moving section is able to pivot only about the single axis relative to the first moving section base; and
- a link mechanism connecting the moving section with the second moving section base so that the relative motion of the second moving section base to the first moving section base causes the moving section to be pivoted about the other axis of the two other axes than the arbitrary one axis, wherein the link mechanism comprises:
- an engaging piece extending from the moving section as one body; and
- a third guide comprising a linear guide provided on the second moving section base and having a stroke which is able to absorb a component, normal to the axial direction of the other drive axis, of a circular arc motion which is given to the engaging piece with the pivot movement of the moving section; and
- wherein the engaging piece is guided for linear movement on the third guide.

2. The moving section turnable machine tool as set forth in claim 1, wherein the third guide is provided obliquely relative to the axial direction of the drive axes.

3. The moving section turnable machine tool as set forth in claim 1, wherein the moving section is a spindle head.

4. The moving section turnable machine tool as set forth in claim 3, wherein:
- the configuration comprises a support shaft pivotably attaching the moving section to the first moving section base;
- the link mechanism includes a coupling shaft coupling the second moving section base and the moving section; and
- the gravity center position of the spindle head is set at a ½ position of the distance between the support shaft and the coupling shaft.

5. The moving section turnable machine tool as set forth in claim 1, wherein the third guide guides the engaging piece to be movable in a direction perpendicular to the axial direction of the drive axes.

6. A moving section turnable machine tool having a moving section which is fed by two synchronized axes along an arbitrary one axis of X, Y and Z-axes being three orthogonal axes, the machine tool comprising:
- a pair of drive axes for feeding the moving section, the drive axes being shifted in the relative position along any one of two other axes than the arbitrary one axis;
- a first moving section base linearly movably guided on a first linear guide and driven by one drive axis of the pair of drive axes in synchronously moving the moving section;
- a second moving section base linearly movably guided on a second linear guide and driven by the other drive axis of the pair of drive axes in synchronously moving the moving section;
- a configuration including a single axis pivotably attaching the moving section directly to the first moving section base such that the moving section is able to pivot only about the single axis relative to the first moving section base; and
- a link mechanism connecting the moving section with the second moving section base so that the relative motion of the second moving section base to the first moving section base causes the moving section to be pivoted about the other axis of the two other axes than the arbitrary one axis, wherein the link mechanism comprises:
- an engaging piece extending form the moving section as one body; and
- a third guide provided on the second moving section base and having a stroke which is able to absorb a component normal to the axial direction of the other drive axis of a circular arc motion which is given to the engaging piece with the pivot movement of the moving section;

wherein the moving section is a spindle head and the spindle head is turnable an angle of 90 degrees between an angle which directs a tool spindle axis horizontally and another angle which directs the tool spindle axis vertically, and the engaging piece is guided on the third guide to be movable in a horizontal direction.

7. A moving section turnable machine tool having a moving section which is fed by two synchronized axes along an arbitrary one axis of X, Y and Z-axes being three orthogonal axes, the machine tool comprising:
- a pair of drive axes for feeding the moving section, the drive axes being shifted in the relative position along any one of two other axes than the arbitrary one axis;
- a first moving section base linearly movably guided on a first linear guide and driven by one drive axis of the pair of drive axes in synchronously moving the moving section;
- a second moving section base linearly movably guided on a second linear guide and driven by the other drive axis of the pair of drive axes in synchronously moving the moving section;
- a configuration including a single axis pivotably attaching the moving section directly to the first moving section base such that the moving section is able to pivot only about the single axis relative to the first moving section base; and
- a link mechanism connecting the moving section with the second moving section base so that the relative motion of the second moving section base to the first moving section base causes the moving section to be pivoted about the other axis of the two other axes than the arbitrary one axis, wherein the moving section is a spindle head and the configuration comprises a support shaft pivotably attaching the moving section to the first moving section base;

the link mechanism includes a coupling shaft coupling the second moving section base and the moving section; and a line connecting the support shaft with the coupling shaft is inclined an angle of 45 degrees relative to the tool spindle axis.

8. The moving section turnable machine tool as set forth in claim 7, wherein the gravity center position of the spindle head is set at a ½ position of the distance between the support shaft and the coupling shaft.

* * * * *